(12) United States Patent
Kwak et al.

(10) Patent No.: US 7,283,254 B2
(45) Date of Patent: Oct. 16, 2007

(54) APPARATUS FOR SHIFTING REFERENCE DISTANCE OF LASER DISPLACEMENT SENSOR

(75) Inventors: Changsoo Kwak, Daejon (KR); Eul Gyoon Lim, Seoul (KR)

(73) Assignee: Electronics and Telecommunications Research Institute (KR)

( * ) Notice: Subject to any disclaimer, the term of this patent is extended or adjusted under 35 U.S.C. 154(b) by 171 days.

(21) Appl. No.: 10/731,557

(22) Filed: Dec. 8, 2003

(65) Prior Publication Data

US 2004/0190004 A1    Sep. 30, 2004

(30) Foreign Application Priority Data

Mar. 26, 2003    (KR) ...................... 10-2003-0018749

(51) Int. Cl.
*G01B 11/14*    (2006.01)
(52) U.S. Cl. ...................................... 356/614; 356/622
(58) Field of Classification Search ...................... None
See application file for complete search history.

(56) References Cited

U.S. PATENT DOCUMENTS

| | | | | |
|---|---|---|---|---|
| 4,636,076 A | * | 1/1987 | Pettigrew | .................... 356/499 |
| 5,239,183 A | * | 8/1993 | Kouno et al. | .......... 250/559.31 |
| 5,640,239 A | * | 6/1997 | Takamiya et al. | ............ 356/486 |
| 5,680,211 A | * | 10/1997 | Kaneda et al. | ............... 356/499 |
| 5,796,470 A | * | 8/1998 | Ueda et al. | .................. 356/28.5 |
| 5,953,125 A | * | 9/1999 | de Groot | ..................... 356/492 |
| 2004/0004723 A1 | * | 1/2004 | Seko et al. | .................. 356/498 |

* cited by examiner

*Primary Examiner*—Michael P. Stafira
(74) *Attorney, Agent, or Firm*—Blakely Sokoloff Taylor & Zafman

(57) ABSTRACT

An apparatus for shifting a reference distance of a laser displacement sensor is capable of extending the measuring range in a laser displacement sensor having a fixed reference distance and a fixed measurement range by smoothly changing the traveling path of the laser beam by selectively inserting the transparent members having a refraction index different from that of the air into the optical path of the laser beam. The apparatus mounted on the laser displacement sensor provided with a laser beam source for generating a laser beam and a laser beam reception member, includes a transparent member having a refraction index being different from a refraction index of an air and a holder for supporting the transparent member in such a way that the transparent member is placed in an optical path of the laser beam. The transparent member changes a reference distance of the laser displacement sensor by changing the optical path of the laser beam.

11 Claims, 5 Drawing Sheets

APPARATUS FOR SHIFTING REFERENCE DISTANCE OF LASER DISPLACEMENT SENSOR

FIELD OF THE INVENTION

The present invention relates to an apparatus and a method for extending the measurement range by shifting the reference distance of a laser displacement sensor; and, more particularly to an apparatus for shifting the reference distance of a laser displacement sensor and for extending the measurement range by changing paths of laser beam by inserting a transparent member having a refraction index different to that of air between the paths of the laser beam.

DESCRIPTION OF RELATED ART

In general, a laser displacement sensor can emit a laser beam to a target object to move or change the position thereof, and measures the movement distance or the position change of the target object by calculating the reception position of the laser beam reflected from the target object. Therefore, the laser displacement sensor includes a laser beam source for generating the laser beam and a laser beam reception member for receiving the laser beam reflected from the target object.

Conventionally, the laser displacement sensor emits the laser beam at a predetermined distance from the target object; and the predetermined distance is called as a reference distance. And, the laser displacement sensor can measure the amount of change of the target object in displacement in a predetermined range to forward and backward with respect to the reference distance as a center; and the predetermined range is called as a measurement range.

FIG. 1 is a schematic diagram illustrating the displacement measurement principle of a conventional laser displacement sensor. Referring to the drawing, a laser beam source 11 emits a laser beam to a target object 13, and the emitted laser beam arrives at a laser beam reception member 12 by the reflection of the target object 13. Assuming that the reference distance is d1, optical paths of the laser beam are L10 and L11.

If the target object 13 is moved backward to a distance D, the optical paths of the laser beam become L10 and L12 and positions to receiving the laser beam at the laser beam reception member 12 move from d3 to d2 in a vertical direction and from W1 to W2 in a horizontal direction. The moving distance D of the target object 13 is calculated by the change of the receiving position.

The process for calculating the moving distance D is obtained from the following equations:

$$W = d_1 \cdot \cot\theta_1 + 2 \cdot D \cdot \cot\theta_1 + d_2 \cdot \cot\theta_1 \quad \text{Eq. (1)}$$

$$W_1 = d_1 \cdot \cot\theta_1 + d_3 \cdot \cot\theta_1$$

$$d_3 - d_2 = X \cdot \cos\theta_1$$

$$W - W_1 = X \cdot \sin\theta_1$$

Arranging the above equations to obtain D:

$$D = \frac{X}{2\cot\theta_1} \quad \text{Eq. (2)}$$

wherein X is a deviation value of the receiving position measured at the laser beam reception member 12 and $\theta_1$ represents an angle of the laser beam incident to the target object 12 as a design parameter of the laser displacement sensor.

However, since the conventional laser displacement sensor has the reference distance and the measure range fixed, the position change of the target object cannot be measured when the target object is placed outside of the reference distance or the position change exceeds the measurement range. Particularly, it is more possible that the reflection type laser displacement sensor has the problems described above since it has a very short measurement distance or a very short reference distance.

For these problems, various displacement sensors have been proposed such as a displacement sensor to move a target object into a reference distance or a number of displacement sensors are provided for each of reference distances, respectively. However, it is very difficult that an operator sets the displacement sensor again as well as it causes a very high manufacturing cost problem for providing a number of displacement sensors for each of the reference distances, respectively.

Therefore, it is required that a device smoothly controls the reference distance or the measurement range of the laser displacement sensor.

SUMMARY OF THE INVENTION

It is, therefore, an object of the present invention to provide an apparatus capable of extending the measuring range in a laser displacement sensor having a fixed reference distance and a fixed measurement range by smoothly changing the traveling path of the laser beam by selectively inserting the transparent members having a refraction index different from that of the air into the optical path of the laser beam.

In accordance with an aspect of the present invention, there is provided an apparatus for shifting a reference distance of a laser displacement sensor, wherein the apparatus is mounted on the laser displacement sensor provided with a laser beam source for generating a laser beam and a laser beam reception member, including: a transparent member having a refraction index being different from a refraction index of an air; and a holder for supporting the transparent member in such a way that the transparent member is placed in an optical path of the laser beam; wherein the transparent member changes a reference distance of the laser displacement sensor by changing the optical path of the laser beam.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Following description only exemplifies the principle of the present invention. Although the description of the principle may not be clear or all possible embodiments of the present invention is not illustrated in the specification, those skilled in the art can embody the principle of the present invention and invent various apparatus within the scope and concept of the present invention from the description. Also, all the conditional terms and embodiments described in the specification are intended to make the concept of this invention understood, in principle, and the present invention should be understood not limited to the described embodiments or conditions only.

Figure 1:
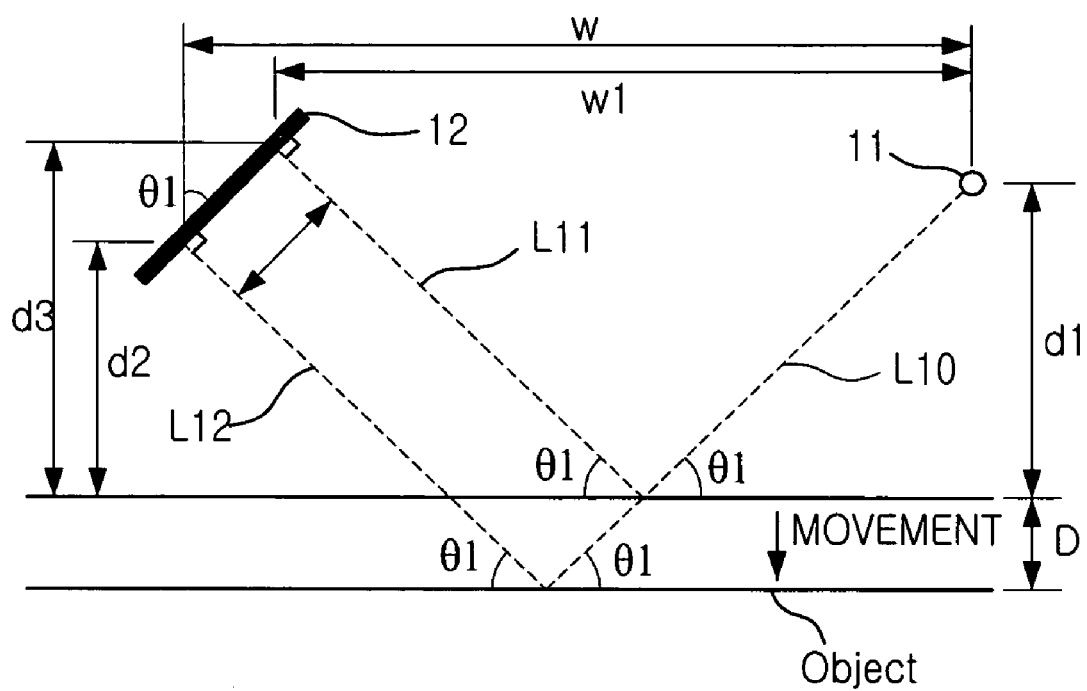
FIG. 1 is a schematic diagram illustrating the displacement measurement principle of a conventional laser displacement sensor.
Figure 2:
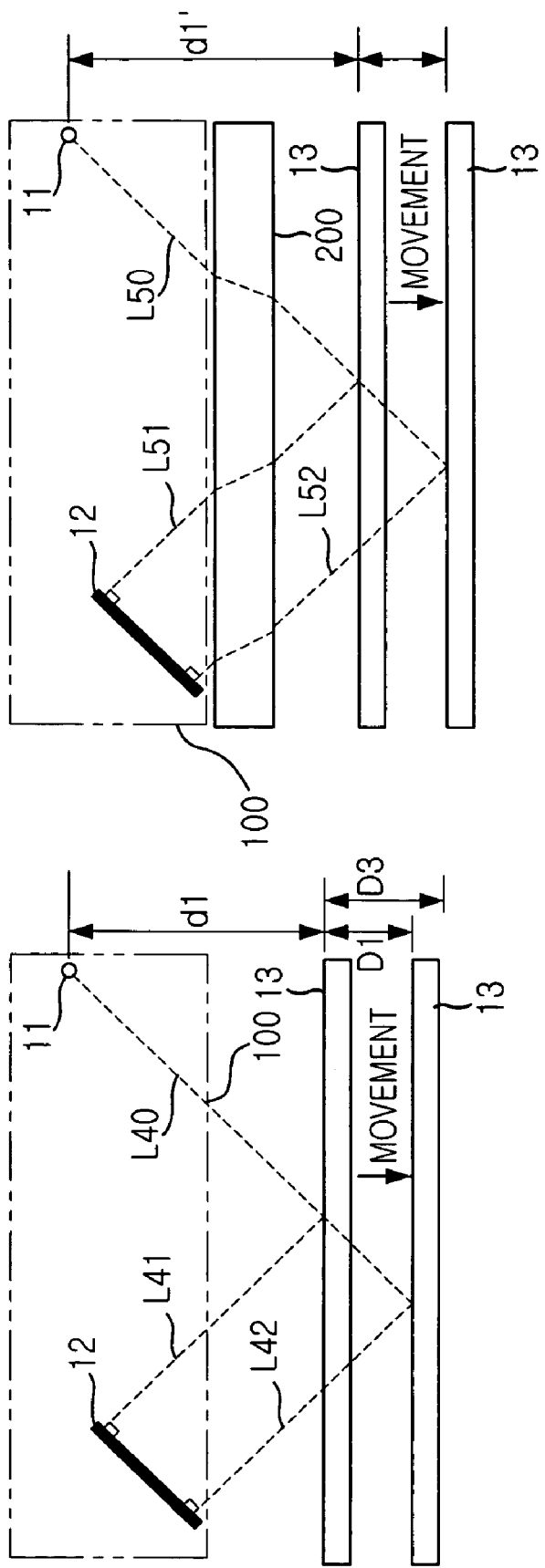
FIG. 2 is a schematic diagram showing a change of a laser beam by inserting a transparent member into a path of laser beam in accordance with a first preferred embodiment of the present invention.

FIG. 2 is a schematic diagram showing a change of a laser beam by inserting a transparent member into a path of laser beam in accordance with a first preferred embodiment of the present invention. Referring to the drawing, the laser displacement sensor 100 includes a laser beam source 11 for generating a laser beam and a laser beam reception member 12 for receiving the laser beam reflected from the target object 13. Further, a flat plane type transparent member 200 having a refraction index larger than that of the air is inserted into the laser displacement sensor 100 and the target object 13.

At first, in the conventional laser displacement sensor, the optical paths of the laser beam are changed from L40 and L41 to L40 and L42 in response to the movement of the measurement range $D_1$ by the target object 13.

Here, if the flat plane type transparent member 200 having a refraction index larger than that of the air is inserted into the optical paths of the laser beam, the optical paths of the laser beam are changed from L50 and L51 to L50 and L52 in response to the movement of the measurement range $D_2$ by the target object 13.

As shown in FIG. 2, although the flat plane type transparent member 200 is inserted, the value of $D_1$ and the value of $D_2$ are equal to each other, since the measurement range cannot be changed. But, since the flat plane type transparent member 200 refracts the laser beam, the reference distance is extended from $d_1$ to $d_2$.

And thus, the reference distance can be changed by selectively inserting various type transparent members 200 in response to various statuses, thereby obtaining the effect to extend the measurement range to $d_3$.

Figure 3:
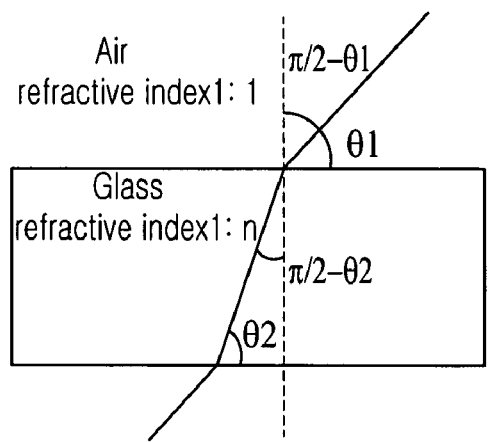
FIG. 3 is a diagram representing Snell's law.

FIG. 3 is a diagram representing the principle of the refraction that the flat plane type transparent member refracts the laser beam emitted from the laser beam source. Here, the refraction index of the air is 1 and assuming that the refraction index n of the flat plane type transparent member 200 is larger than that of the air.

As shown in FIG. 3, when the laser beam emitted from the laser beam source is incident to the flat plane type transparent member 200, the flat plane type transparent member 200 refracts the optical path of the laser beam. As this, when the light beam is incident to medium having a different refraction index from each other, the optical path of the light beam is refracted and this effect is known as Snell's law. That is, if the two mediums are isotropic, the following equations are obtained from the Snell's law:

$$1 \times \sin\left(\frac{\pi}{2} - \theta_1\right) = n \times \sin\left(\frac{\pi}{2} - \theta_2\right) \qquad \text{Eq. (3)}$$
$$\cos\theta_1 = n\cos\theta_2$$

Figure 4:
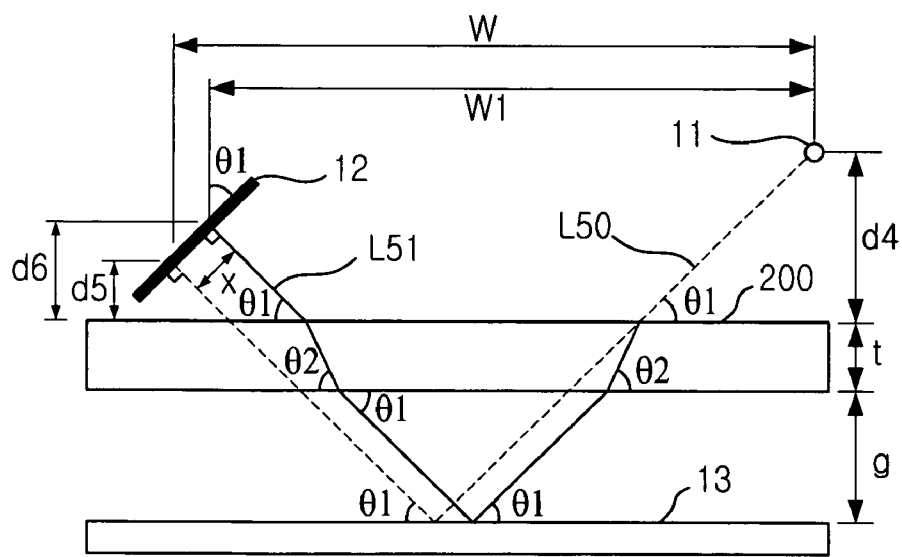
FIG. 4 is a diagram illustrating a reference distance changed in accordance with the first preferred embodiment of the present.

FIG. 4 is a diagram illustrating a reference distance changed in accordance with the first preferred embodiment of the present. Here, assuming that a thickness of the flat plane type transparent member 200 is a constant value t.

Referring to the drawing, the laser beam emitted from the laser beam source 11 to the target object 13 is refracted by the flat plane type transparent member 200 and the refracted laser beam is reflected by the target object 13 to arrive at the laser beam reception member 12 (referring to L50 and L51).

A receiving position X changed by the flat plane type transparent member 200 is calculated as follows:

$$W = (d_4 + 2t + 2g + ds)\cot\theta_1 \qquad \text{Eq. (4)}$$
$$W_1 = (d_4 + 2t + 2g + d_6)\cot\theta_1$$
$$d_6 - d_5 = X\cos\theta_1$$
$$W - W_1 = X\sin\theta_1$$
$$W - W_1 = 2t(\cot\theta_1 - \cot\theta_2) + (d_5 - d_6)\cot\theta_1 =$$
$$dt(\cot\theta_1 - \cot\theta_2) - X\cos\theta_1\left(\frac{\cos\theta_1}{\sin\theta_1}\right) = X\sin\theta_1$$
$$X\sin 2\theta_1 + X\cos 2\theta_1 = 2t\left(\frac{\cos\theta_1}{\sin\theta_1} - \frac{\cos\theta_2}{\sin\theta_2}\right)\sin\theta_1$$
$$X = 2t\cos\theta_1 \times 2\left(1 - \frac{\cos\theta_2}{\cos\theta_1}\frac{\sin\theta_1}{\sin\theta_2}\right)$$
$$X = 2t\cos\theta_1 \times 2\left(1 - \frac{1}{n}\frac{\sin\theta_1}{\sqrt{1 - \left(\frac{\cos\theta_2}{n}\right)^2}}\right)$$

Therefore, the following equation can be obtained from the above equations:

$$\frac{X}{2\cos\theta_1} = t \times \left(1 - \frac{\sin\theta_1}{\sqrt{n^2 - \cos 2\theta_2}}\right) \qquad \text{Eq. (5)}$$

In this result, the reference distance of the laser displacement sensor is extended by a predetermined amount of distance $d_1$ as follows:

$$d_1 = t \times \left(1 - \frac{\sin\theta_1}{\sqrt{n^2 - \cos 2\theta_2}}\right) \qquad \text{Eq. (6)}$$

Since the same laser displacement sensor can measure the displacement, when the target object 13 moves away by the predetermined distance $d_1$, this means that the measurement range is extended by the corresponding amount.

Figure 5:
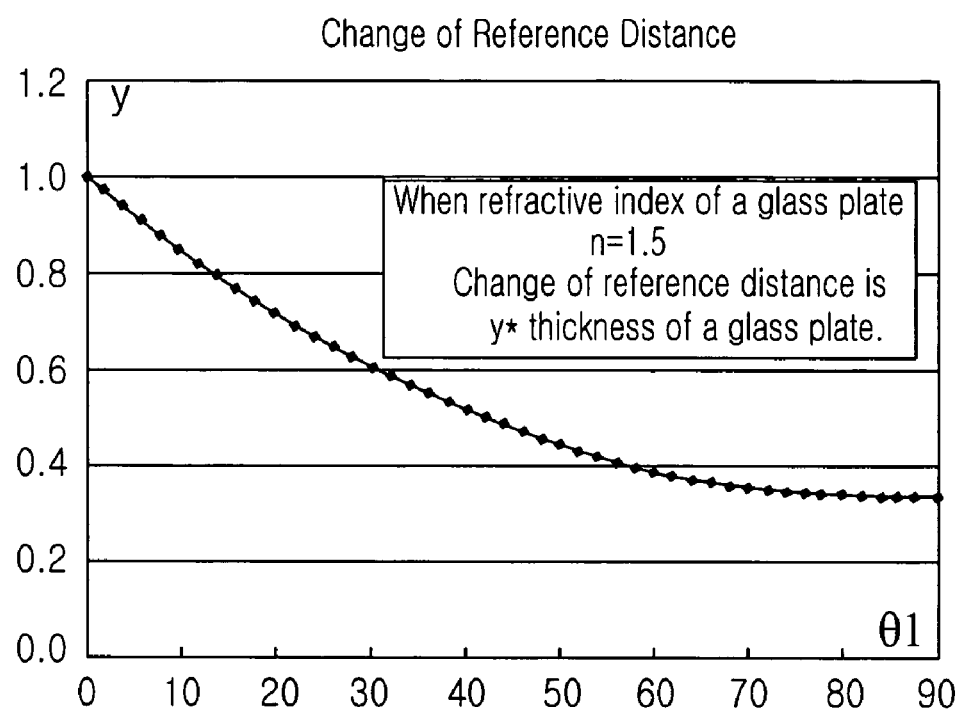
FIG. 5 is a graph illustrating the reference distance changed in FIG. 4.

FIG. 5 is a graph illustrating the reference distance changed in response to the incident angle ($\theta_1$) of the laser beam incident to the flat plane type transparent member 200.

Here, assuming that the flat plane type transparent member 200 is made of a glass substrate being a refraction index of 1.5.

The graph shown in FIG. 5 represents as an equation as follows:

$$y = t \times \left(1 - \frac{\sin\theta_1}{\sqrt{n2 - \cos 2\theta_2}}\right) \quad \text{Eq. (7)}$$

If θ1 is 40° and a thickness of the glass substrate is 5 mm, the y is 0.05016 and the reference distance extends to 2.51 mm. As described in the equation, shorter the reference distance of the laser displacement sensor, larger the value of the reference distance extending as the thickness of the flat plane type transparent member 200 becomes thicker.

Figure 6:
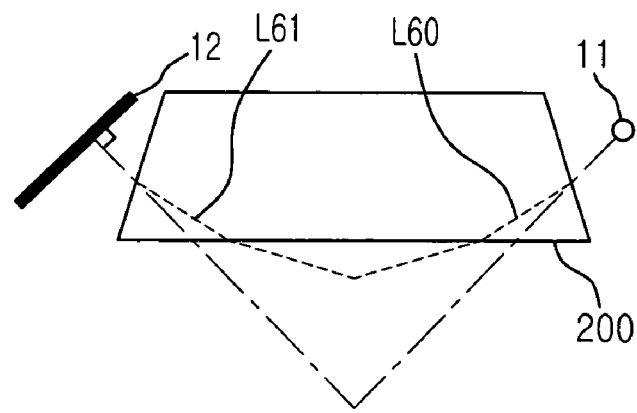
FIG. 6 is a view representing the status that a transparent member having a trapezoid cross section in accordance with a second preferred embodiment of the present invention.

FIG. 6 is a view representing the status that a transparent member having a trapezoid cross section in accordance with a second preferred embodiment of the present invention. As described in the drawing, the laser beam emitted from the laser beam source 11 arrives at the laser beam reception member 12 by refracting into the flat plane type transparent member 200 (referring to L60 and L61).

Therefore, the reference distance of the laser displacement sensor provided with the flat plane type transparent member 200 becomes shorter than the original reference distance and obtains the effect that the measuring range is extended by selectively inserting the flat plane type transparent member 200.

In this result, by selectively inserting various type of transparent members into the optical paths of the laser beam, the reference distance can be moved and the measuring range can be extended in accordance with the preferred embodiments of the present invention.

And also, although the present invention explains that the optical path of the laser beam can be changed by inserting the same type of transparent member into the laser beam source 11 and the laser beam reception member 12 in the preferred embodiments, the split of the present invention does not limit to this, therefore, it should be noted that the optical path of the laser beam is changed by inserting the transparent member into only one of the laser beam source 11 and the laser beam reception member 12.

Figure 7:
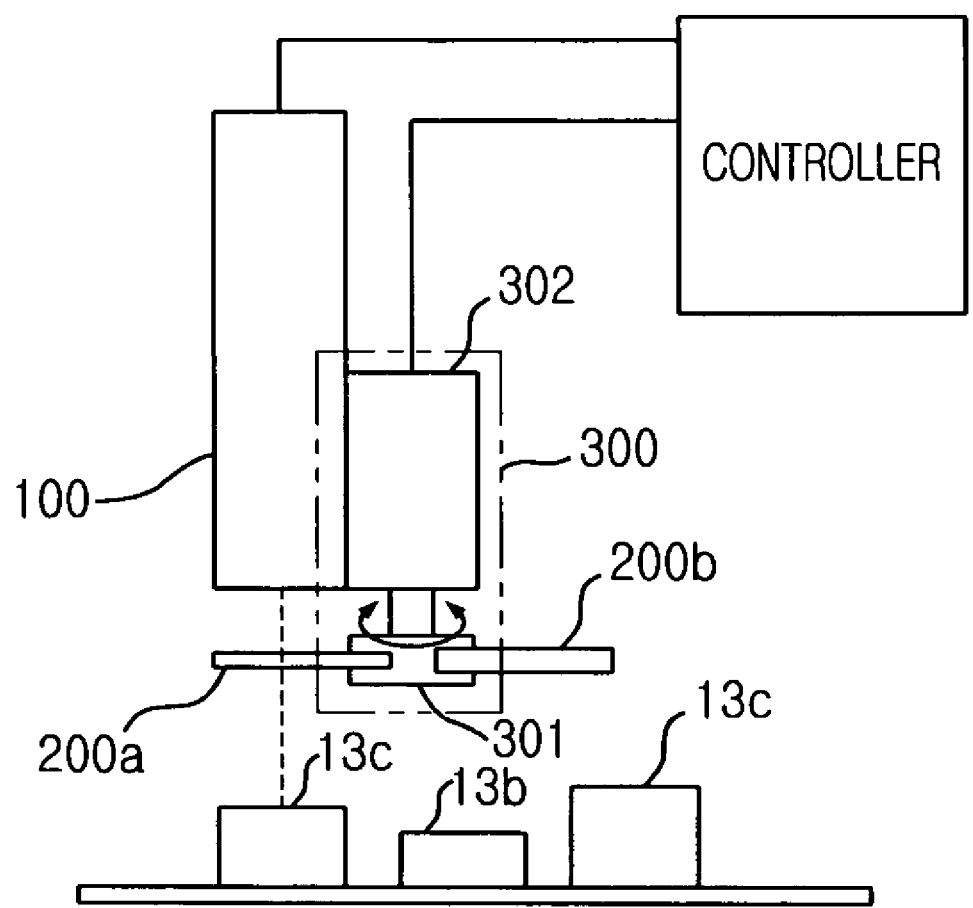
FIG. 7 is a construction diagram depicting a device for inserting a transparent member in accordance with a third preferred embodiment of the present invention.

FIG. 7 is a construction diagram depicting a device for inserting a transparent member in accordance with a third preferred embodiment of the present invention. Referring to the drawing, the device 300 for inserting a transparent member includes a plurality of transparent members 200a, 200b having various thickness, a holder 301 for supporting the plurality of the transparent members 200a, 200b in a radial direction and for selectively placing the plurality of the transparent members 200a, 200b into the optical path of the laser beam and a holder driving member 302 for automatically rotating and moving the holder 301. The holder 301 is rotated and moved by a physical force transmitted from the holder driving member 302 and the holder driving member 302 can be electronically controlled by an additional control block.

As described in the drawing, in case when the heights of the plurality of target objects 13a, 13b, 13c should be measured, it is very difficult to measure the height of the target object placed at a position which exceeds the reference distance of the laser displacement sensor 100. Therefore, the heights of the various target objects 13a, 13b, 13c can be measured by changing the reference distance by inserting an appropriate transparent member into the optical path of the laser beam and by extending the measuring range.

For example, in case when the laser displacement sensor 200 is adapted for the target object 13c having the highest height, in order to measure the target object 13a having a height lower than the highest height, the lower height can be measured by extending the reference distance by inserting the transparent member 20a having a thin thickness into the optical path of the laser beam.

In order to measure the height of the target object 13b having the lowest height, it can be measured by extending the reference distance by inserting the transparent member 200b having a thick thickness.

As described above, the present invention can extend the measuring range by selectively inserting the transparent members having various thicknesses into the laser displacement sensor having the fixed reference distance.

In accordance with the preferred embodiments of the present invention, the present invention is capable of extending the measuring range in a laser displacement sensor having a fixed reference distance and a fixed measurement range by smoothly changing the traveling path of the laser beam by selectively inserting the transparent members having a refraction index different from that of the air into the optical path of the laser beam.

Therefore, the present invention can improve the utilization of the laser displacement sensor; this is achieved by measuring various target objects with only one laser displacement sensor by replacing the transparent member according to the measuring status.

While the present invention has been described with respect to certain preferred embodiments, it will be apparent to those skilled in the art that various changes and modifications may be made without departing from the scope of the invention as defined in the following claims.

What is claimed is:

1. An apparatus for shifting a reference distance of a laser displacement sensor, wherein the apparatus is mounted on the laser displacement sensor provided with a laser beam source for generating a laser beam and a laser beam reception member, the apparatus comprising:
    a transparent member having a refraction index being different from a refraction index of an air; and
    a holder for supporting the transparent member in such a way that the transparent member is placed in an optical path of the laser beam;
    wherein the transparent member changes a reference distance of the laser displacement sensor by changing the optical path of the laser beam, and the holder supports a plurality of transparent members.

2. The apparatus as recited in claim 1, wherein the plurality of transparent members have a thickness different from each other.

3. The apparatus as recited in claim 2, further comprising a holder driving member for physically moving the holder in such a way that one of the plurality of transparent members is selectively placed in the optical path of the laser beam.

4. The apparatus as recited in claim 3, wherein the holder supports the plurality of transparent members in a radial direction and the holder-driving member rotatably moves the holder.

5. The apparatus as recited in claim 4, wherein the transparent member is made of a material having a refraction index being larger than a refraction index of an air.

6. The apparatus as recited in claim 4, wherein the transparent member having a refraction index larger than a refraction index of an air and made of a glass material in the form of a flat plane having a trapezoid cross-section.

7. An apparatus comprising:
   a device mounted on a laser displacement sensor provided with a laser beam source for generating a laser beam and a laser beam reception member, the device including
      a transparent member having a refraction index being different from a refraction index of an air; and
      a holder for supporting the transparent member in such a way that the transparent member is placed in an optical path of the laser beam;
wherein the transparent member changes a reference distance of the laser displacement sensor by changing the optical path of the laser beam and the holder supports a plurality of transparent members having a thickness different from each other.

8. The apparatus as recited in claim 7, further comprising a holder driving member for physically moving the holder in such a way that one of the plurality of transparent members is selectively placed in the optical path of the laser beam.

9. The apparatus as recited in claim 8, wherein the holder supports the plurality of transparent members in a radial direction and the holder-driving member rotatably moves the holder.

10. The apparatus as recited in claim 9, wherein the transparent member is made of a material having a refraction index being larger than a refraction index of an air.

11. The apparatus as recited in claim 9, wherein the transparent member having a refraction index larger than a refraction index of an air and made of a glass material in the form of a flat plane having a trapezoid cross-section.

* * * * *